April 2, 1957 R. G. KRASBERG 2,787,039
HOSE CLAMP
Filed March 16, 1953
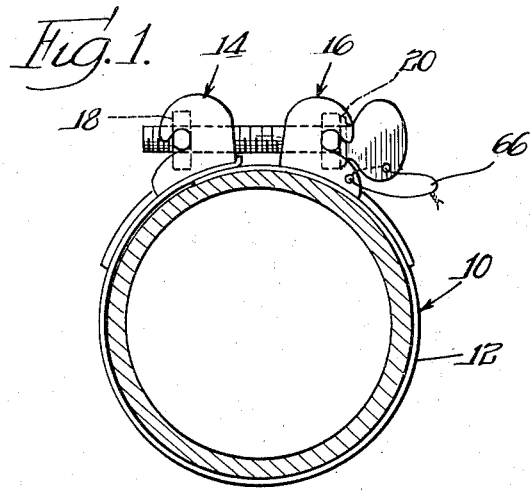
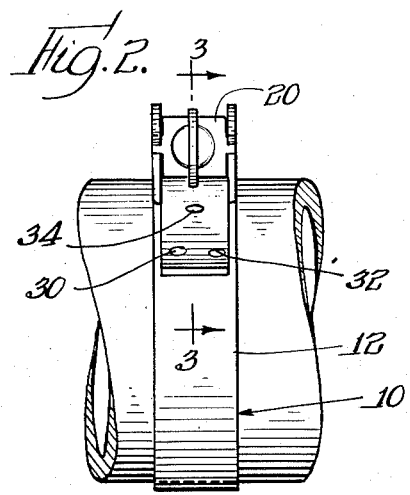
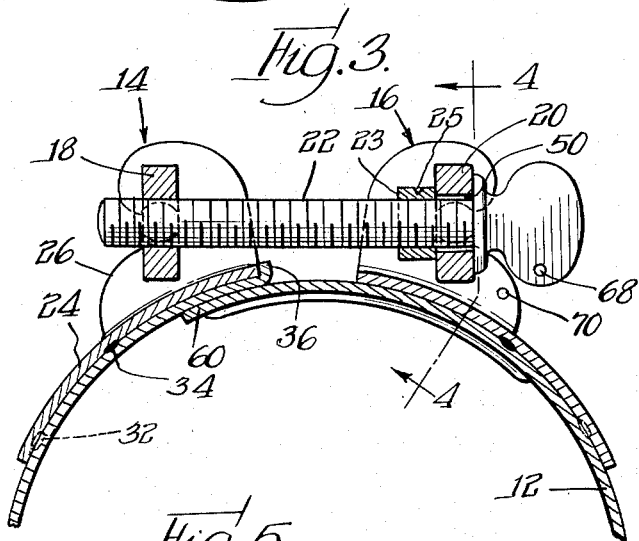
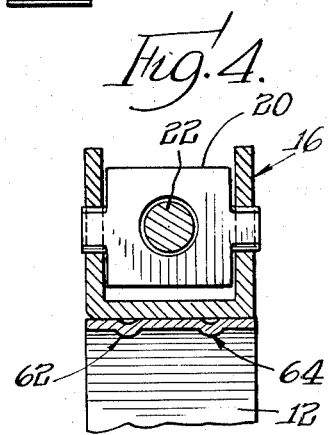
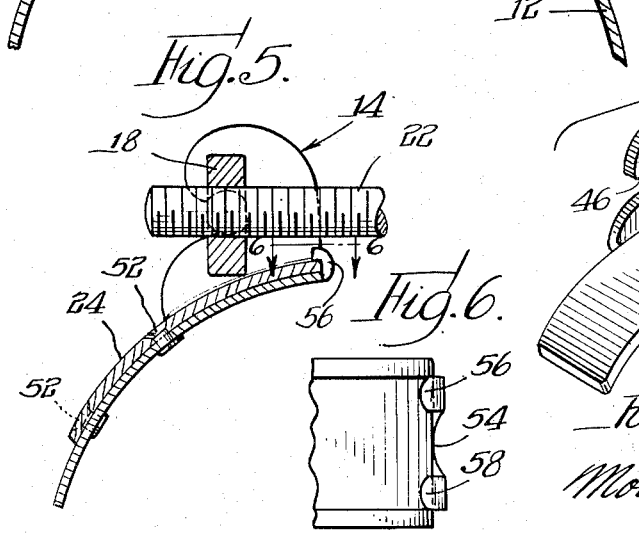
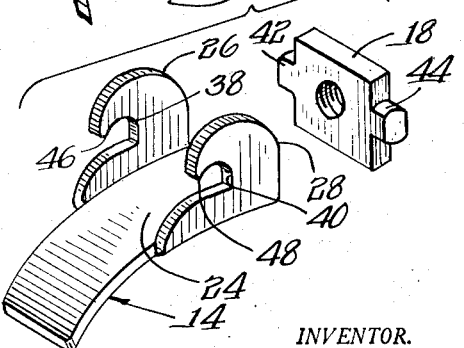
INVENTOR.
Rudolf G. Krasberg
BY
Moore, Olson & Trexler
attys.

United States Patent Office 2,787,039
Patented Apr. 2, 1957

2,787,039

HOSE CLAMP

Rudolf G. Krasberg, Chicago, Ill.

Application March 16, 1953, Serial No. 342,404

2 Claims. (Cl. 24—279)

The present invention relates to a novel hose clamp, and more particularly to a novel clamp of the type having a split ring carrying nut means adjacent its opposite ends, whereby the ends may be drawn together by a suitable screw member.

Hose clamps heretofore known in the prior art have generally included a member for mounting suitable nut means to the clamp ring, which member is often secured to the ring by folding an end portion of the ring over the member and securing the end portion in various ways. The nut means is usually provided with a pair of lugs adapted to be received in apertures in opposite sides of the mounting member when said sides are folded to enclose the nut. These prior art devices have been relatively complicated and difficult to manufacture and assemble, thereby increasing their cost. Furthermore, these prior art devices have required excessive amounts of material, due to folding the end portion of the ring about the nut mounting members, and because considerable overlapping between the ends of the ring must be provided in order to obtain a substantially smooth clamping surface.

An object of the present invention is to overcome the above mentioned objections to the prior art devices by providing a novel hose clamp of simple construction which may be readily and economically manufactured.

Another object of the present invention is to provide a novel hose clamp of the above described type, wherein the parts thereof may be easily and rapidly assembled.

Still another object of the present invention is to provide a novel hose clamp of the above described type which may be quickly and easily applied to a desired work piece.

Another object of the present invention is to provide a novel hose clamp of the above described type with means for permitting locking of the clamp in a tightened condition.

Other objects and advantages of the present invention will become apparent from the following description and the accompanying drawings, wherein:

Fig. 1 is an end elevational view, showing a novel clamp embodying the principles of this invention applied to a suitable work piece;

Fig. 2 is a side elevational view, showing the novel clamp of Fig. 1;

Fig. 3 is an enlarged fragmentary cross sectional view taken along line 3—3 in Fig. 2;

Fig. 4 is a vertical cross sectional view taken along line 4—4 in Fig. 3;

Fig. 5 is a fragmentary cross sectional view similar to Fig. 3, but showing a modified form of the present invention;

Fig. 6 is a fragmentary cross sectional view taken along line 6—6 in Fig. 5; and Fig. 7 is an exploded perspective view, showing novel elements of this invention.

Referring now more specifically to the drawings, wherein like parts are designated by the same numerals throughout the various figures, a novel hose clamp 10, embodying the principles of this invention is shown best in Figs. 1 and 2. The clamp 10 includes a ring 12 formed of any suitable material, such as sheet metal. A pair of nut means mounting members 14 and 16 are secured to the ring in a manner fully described hereinbelow. A nut 18 is supported by the member 14, and a nut-like or bearing member 20 is supported in the mounting member 16. A suitable thumb screw is provided having a threaded shank 22 slidably extending through the bearing member 20 and threaded through the nut 18, as shown best in Fig. 3. Preferably, a collar 23 is assembled over the shank 22 to prevent removal of the screw from the bearing member. The collar is indented, as at 25, after assembly with the screw to prevent relative axial displacement between the collar and the screw by interlocking engagement with the screw threads or any other suitable projections on the screw.

Referring particularly to Fig. 7, it will be seen that the nut mounting member 14 includes a generally U-shaped portion having a curved base 24 and a pair of upstanding legs 26 and 28. Preferably, the base 24 extends for a substantial distance beyond the boundaries of the upstanding legs. The base 24 is formed so that it conforms to the curvature of the ring 12, as shown best in Fig. 3. The mounting member 14 may be quickly and easily secured to the ring 12 by means of simple spot welds. As shown best in Figs. 2 and 3, a pair of spot welds 30 and 32 are provided adjacent the end of the extended portion of the mounting member base. A third spot weld 34 may be provided for increased strength. It should be noted that this third spot weld is preferably located above and between the first mentioned welds. It should be noted that these welds are located well down on the side of the ring so that as the clamp is tightened, a substantial component of the forces applied to the nut mounting member 14 tends to press the base 24 against the ring 12 so that the welds take a substantial portion of the load under compression, rather than shear. Because of this arrangement, the simple and economical welds have sufficient strength to resist rupture when the clamp is tightened. The mounting member 16 is constructed and secured to the ring in substantially the same manner as the member 14, and, therefore, need not be described in detail. It should be noted that the novel means for securing the mounting members 14 and 16 to the ring leaves the inner work engaging surface of the ring substantially smooth and uninterrupted, so that it is only necessary to overlap the ends of the ring sufficiently to prevent complete separation when the ring is in an expanded condition. This results in a substantial saving in material over the devices heretofore known in the prior art and also permits the ends of the ring to be pulled apart in a manner well known to those skilled in the art for application to a work piece without unduly stressing the material of the ring. In certain cases, it may be found desirable to fold the end of the ring, as at 36 (see Fig. 3) to provide an abutment engaging the end of the mounting member 14.

Referring to Fig. 7, it will be seen that the legs 26 and 28 of the member 14 are provided with apertures 38 and 40, respectively, for receiving lugs 42 and 44 extending from the sides of the nut 18. The apertures 38 and 40 communicate with the exterior of the legs through restricted slots or openings 46 and 48, respectively. It will be noted that the lugs 42 and 44 are generally rectangular in shape presenting major and minor axes so that by turning the nut, the lugs may slide through the restricted slots into the openings 38 and 40, whereupon turning of the nut to its operative position shown in Fig. 3 locks the lugs within the apertures. It is thus seen that the nut 18 may be quickly and easily assemblied with the mounting member. The mounting member 16 is provided with substantially identical openings and restricted slots to provide for ready assembly of the bearing member 20. It will be understood that the bearing member 20 is substantially identical to the nut 18, except that it is provided with an enlarged bore 50 to permit the thumb screw to slide therethrough, and the bore of the nut 18 and the large bore 50 each having its axis extending in the direction of the minor axes of the lugs. If desired, the portions of the legs above the slots in the mounting members 14 and 16 may be deformed downwardly after the nut and the bearing member 20 have been assembled to restrict the slots 46 and 48 and to prevent the nut and bearing members from becoming accidently disassembled.

Referring now particularly to Figs. 5 and 6, wherein a slightly modified form of the present invention is illustrated, it will be seen that in general the parts are constructed in the same manner as the parts described above, as indicated by the application of identical reference numerals. However, in this embodiment, the spot welds have been replaced by similarly arranged small flat head rivets 52. These rivets may be applied when suitable welding equipment is not available. Another difference is that instead of providing the abutment 36 at the end of the ring 12, the end of the ring is recessed, as at 54, to provide fingers 56 and 58, which fingers are then folded around the edge of the base 24 of the nut mounting member. It should be noted that these fingers are disposed at opposite sides of the ring so as to avoid any possible interference with the thumb screw as the screw is assembled through the nut. It will, of course, be understood that these fingers 56 and 58 may be equally well applied to the embodiment utilizing the spot welds and that the abutment 36 may be applied to the embodiment utilizing the rivets.

The novel clamp of this invention may be applied to and tightened to a work piece in any suitable manner well known to those familiar with this art. As the thumb screw is tightened to draw the ends of the ring together, there is a tendency to bend or collapse the free end 60 of the ring. In order to avoid such undesirable bending, a pair of rigidifying ribs 62 and 64 have been provided which extend from a point adjacent the end of the ring to that portion of the ring where the mounting member 16 is secured. After the thumb screw has been tightened the desired amount, it may be securely locked against loosening by passing a locking wire 66 through apertures 68 and 70 in the thumb screw and mounting member 16, respectively.

From the above description, it is seen that the present invention has provided a novel hose clamp of simple construction which may be readily and economically manufactured. Furthermore, it is seen that because of the novel structure of the hose clamp of this invention, substantial savings in material may be effected. In addition, the novel structure of this invention permits easy assembly of the parts and easy application of the clamp to a desired work piece.

While the preferred embodiments of the present invention have been shown and described herein, it is obvious that many structural details may be changed without departing from the spirit and scope of the appended claims.

I claim:

1. A clamp comprising a split ring, screw receiving means including base members secured to adjacent ends of the ring and overlying and generally conforming to portions thereof, a pair of spaced legs extending outwardly from at least one base member, said legs having aligned apertures extending transversely thereof and opening along margins of the legs through restricted passageways, a screw receiving element having a screw receiving opening therethrough and aligned lugs extending outwardly from opposite edges thereof, each lug having a cross section presenting major and minor axes with the minor axis of a dimension permitting the lugs to pass through the restricted passageways into the aligned apertures and with the major axis of a dimension greater than the width of the restricted passageways, said screw receiving element being rotatable with the lugs in the aligned apertures to a position with the major axis of each lug positioned across the restricted passageways to prevent the screw receiving element from passing outwardly through the restricted passageways, and a screw member extending through the screw receiving opening in the screw receiving element and adapted for attachment to a screw receiving member carried by the other base member for adjusting the relative position of the ends of the ring.

2. A clamp as claimed in claim 1, wherein the axis of the screw receiving opening in the screw receiving element extends in the direction of the minor axis of said lugs.

References Cited in the file of this patent

UNITED STATES PATENTS

| | | |
|---|---|---|
| 212,171 | Barnhart et al. | Feb. 11, 1879 |
| 649,916 | Dietrich | May 22, 1900 |
| 759,255 | Ferguson | May 10, 1904 |
| 1,309,476 | Hill | July 8, 1919 |
| 1,804,358 | Lyons et al. | May 5, 1931 |
| 2,283,179 | Buckingham | May 19, 1942 |
| 2,341,828 | Tetzlaff | Feb. 15, 1944 |
| 2,402,710 | Tinnerman | June 25, 1946 |
| 2,409,128 | Krasberg | Oct. 8, 1946 |
| 2,426,857 | Birkenmaier | Sept. 2, 1947 |

FOREIGN PATENTS

| | | |
|---|---|---|
| 423,700 | France | Feb. 22, 1911 |
| 931,202 | France | Sept. 29, 1947 |
| 529,069 | Great Britain | Nov. 13, 1940 |